Jan. 11, 1927.　　M. K. JACKSON ET AL　　1,614,367

BRAKE ATTACHMENT

Filed May 25, 1926

INVENTORS
Maceo. K. Jackson
BY Edward D. Hackett,
Geo. P. Kimmel  ATTORNEY.

Patented Jan. 11, 1927.

1,614,367

UNITED STATES PATENT OFFICE.

MACEO K. JACKSON AND EDWARD D. HACKETT, OF WASHINGTON, DISTRICT OF COLUMBIA.

BRAKE ATTACHMENT.

Application filed May 25, 1926. Serial No. 111,570.

This invention relates to a brake release attachment for motor vehicles, and has for its object to provide, in a manner as hereinafter set forth means for releasing the emergency or hand brake of a vehicle synchronously with the low gear throw of the gear shift lever under such conditions preventing any possibility of the starting of the vehicle with the emergency or hand brake applied, and further with such means constructed and arranged in a manner to prevent the interference thereof with the gear shift lever when the latter is shifted to a selected position, during the travel of the vehicle, after the initial shift of such lever.

Further objects of the invention are to provide a brake release attachment, in a manner as hereinafter set forth and for the purpose referred to which is simple in its construction and arrangement, strong, durable, automatic in its action, compact, readily installed with respect to the gear shift and hand brake levers of a motor vehicle, thoroughly efficient in its use, and comparatively inexpensive to set up.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
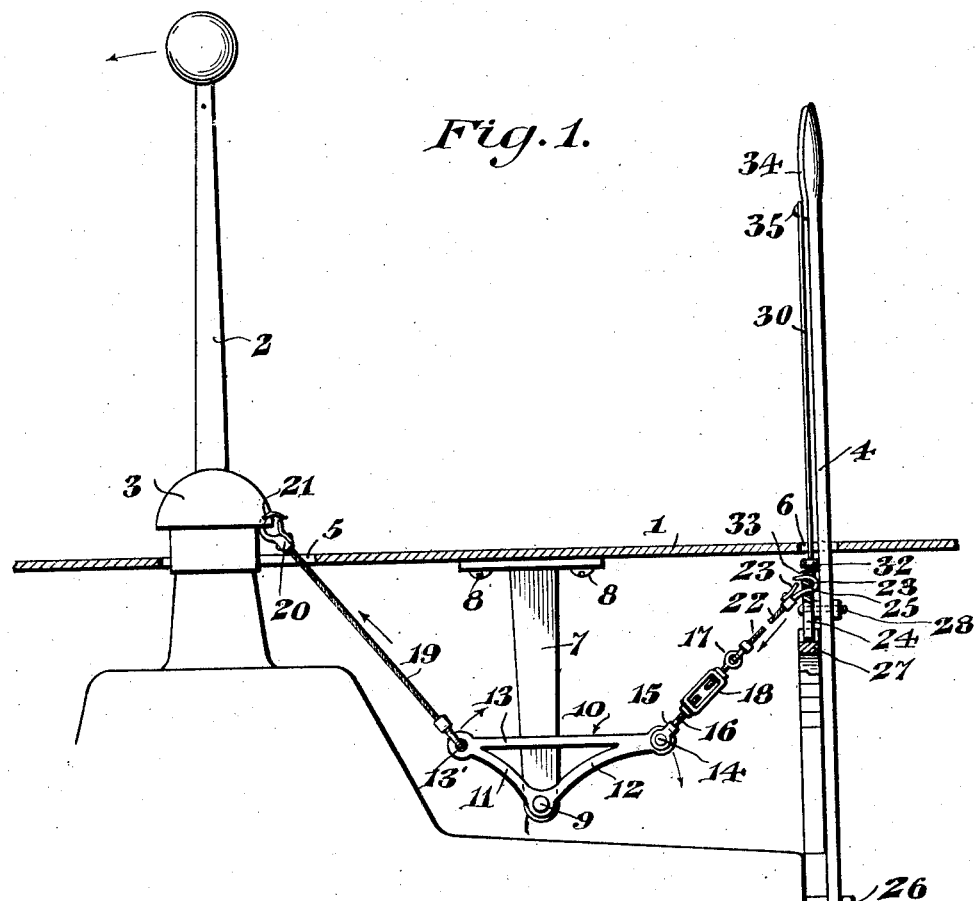
Figure 1 is an elevation of a gear shift and an emergency brake lever of a motor vehicle showing the adaptation with said levers of an attachment in accordance with this invention.
Figure 2:
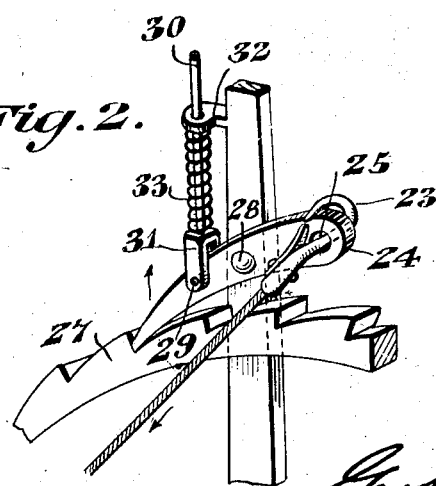
Figure 2 is a fragmentary view, in side elevation, illustrating the locking means for the brake lever.

Referring to the drawings in detail 1 denotes the floor board of a motor vehicle, 2 the gear shift lever provided with a bell 3, 4 the emergency or hand brake lever and 5, 6 openings formed in the floor board 1 for the passage respectively of the levers 2 and 4. As is well known the emergency or hand brake lever of a motor vehicle is spring released. The foregoing elements are of known construction.

A brake release attachment, in accordance with this invention, includes a hanger member 7 which is fixedly secured as at 8 to the lower face of the floor board 1 and depends from the latter. Pivotally connected to the lower end of a hanger member 7, as at 9, is a bell crank referred to generally by the reference character 10 and which consists of a pair of oppositely disposed upwardly extending arms 11, 12 inclining in opposite directions with respect to each other and connected together at their upper ends by a bar 13. The arm 11 is of less length than the arm 12 and projects towards the gear shift lever 2, and the arm 12 projects towards the lever 4. The pivot 9 for the bell crank 10 is positioned at the point of joinder of the lower end of the arm 11 with the lower end of the arm 12, and as the arm 11 is of less length than the arm 12, the bell crank lever 10 is pivoted off center. The upper end of the arm 11 is formed with an eye 13 and the upper end of the arm 12 has pivotally connected therewith, as at 14 a socket forming member 15 provided with a threaded bolt 16 which is attached to the member 15. Opposing the bolt 16 is an eye bolt 17 adjustably connected together by a coupling member 18. The elements 15, 16, 17 and 18 provide a turn buckle and which is pivotally connected at its lower end as at 14 to the upper end of the arm 12.

Connected to the eye 13 of the arm 11 and extending at an upward inclination and towards the bell 3, is a flexible pulling member 19, provided at its upper end with a snap hook 20 for detachably connecting it to the bell 3, the latter being provided with an opening 21 for the passage of the bill of the hook 20. Connected to the eye bolt 17 is an upwardly extending flexible member 22 provided at its upper end with a snap hook 23 for connection with a pivoted pawl or dog 24, the latter being provided with an opening 25 for the passage of the shank of the snap hook 23.

The lever 4 is pivotally mounted as at 26 and positioned at one side of the lever 4 is a rack 27 engaged by the dog 24 for the purpose of locking the lever 4 in applied position. The dog 24 is pivotally connected, as at 26 to the lever 4 and said dog 24 has pivotally connected therewith, as at 29 a spring controlled shifting bar therefor. The bar is indicated at 30 and provided at its lower end with a yoke 31 which straddles the dog 24 and is pivotally connected with the latter as at 29. The bar 30 is slidably connected at one side of the lever 4 by a keeper 32 and extends to the upper end of the lever 4. Mounted on the bar 30 and interposed between the keeper 32 and the yoke 31 is a controlling spring 33 which normally acts to maintain the bar 30 in a lowered position to cause the dog 24 to engage the rack 27. A handle member 34 is pivotally connected as at 35 to the bar 30 for the purpose of shifting the same upwardly whereby the dog 24 is carried therewith.

When the brake 4 is applied it is held in such position, by the dog 24 engaging one of the teeth of the rack 27. Now it will be assumed that the vehicle is to be started, and on the shift of the lever 2 to throw the transmission in low gear the member 19 will be carried with said lever rocking the bell crank 10, and through the medium of the connections between the bell crank 10 and the pawl 24, the latter will be moved clear of the rack 27 thereby providing for the release of the lever 4 through the action of the controlling spring for the latter. The releasing of the dog 24 is had against the action of the spring 33 and after the dog 24 is released the connection between the bell crank 10 and the bell 3 will have no effect upon the dog. The dog 24 will be shifted to engage the rack, after the dog 24 is released through the medium of the spring 33. The attachment provides for the automatic release of the emergency or hand brake lever 4 on the low gear shift of the gear shift lever 2 and under such conditions it prevents any possibility of the starting of the vehicle with the emergency or hand brake lever 4 applied, as the release of the lever 4 is had synchronously with such shift of the lever 2.

The turn buckle provides means whereby the attachment can be adjusted for installation in various types of motor vehicles and further to compensate for the wear of the emergency or hand brake mechanism.

It is thought the many advantages of a brake release attachment, in accordance with this invention for the purpose set forth, can be readily understood, and although the preferred embodiment of the invention is as illustrated and described, yet it is to be understood that changes in the details of construction can be had which will fall within the scope of the invention as claimed.

What we claim is:

1. An attachment for the purpose set forth comprising a pivoted element, a pulling connection attached thereto and leading therefrom to the locking means for an emergency brake, and a pulling connection attached to said element and extending at an opposite direction with respect to the first mentioned pulling connection and leading from said element to a gear shift lever and providing means on the throw of the gear shift lever for low gear to rock said element thereby operating the first mentioned pulling connection to release the locking means for the emergency brake.

2. An attachment for the purpose set forth comprising a pivoted element, a pulling connection attached thereto and leading therefrom to the locking means for an emergency brake, a pulling connection attached to said element and extending at an opposite direction with respect to the first mentioned pulling connection and leading from said element to a gear shift lever and providing means on the throw of the gear shift lever for low gear to rock said element thereby operating the first mentioned pulling connection to release the locking means for the emergency brake, and each of said pulling connections including a flexible member.

3. An attachment for the purpose set forth comprising a pivoted element, a pulling connection attached thereto and leading therefrom to the locking means for an emergency brake, a pulling connection attached to said element and extending at an opposite direction with respect to the first mentioned pulling connection and leading from said element to a gear shift lever and providing means on the throw of the gear shift lever for low gear to rock said element thereby operating the first mentioned pulling connection to release the locking means for the emergency brake, said first mentioned pulling connection being lengthwise adjustable and each of said pulling connections including a flexible member.

4. An attachment for the purpose set forth comprising a pivoted element, a pulling connection attached thereto and leading therefrom to the locking means for an emergency brake, a pulling connection attached to said element and extending at an opposite direction with respect to the first mentioned pulling connection and leading from said element to a gear shift lever and providing means on the throw of the gear shift lever for low gear to rock said element thereby operating the first mentioned pulling connection to release the locking means for the emergency brake, said element being eccentrically pivoted.

5. An attachment for the purpose set forth comprising a pivoted element, a pulling connection attached thereto and leading therefrom to the locking means for an emergency brake, a pulling connection attached to said element and extending at an opposite direction with respect to the first mentioned pulling connection and leading from said element to a gear shift lever and providing means on the throw of the gear shift lever for low gear to rock said element thereby operating the first mentioned pulling connection to release the locking means for the emergency brake, said element including a pair of arms of different lengths, the shortest of said arms being connected to the last mentioned pulling connection and the longest of said arms being attached to the first mentioned pulling connection.

6. In an attachment for synchronously releasing the locking means of an emergency brake lever on the throw of a gear shift lever for low gear, a releasing mechanism interposed between and having oppositely extending flexible means for connection to the gear shift lever and locking means respectively and actuated on such throw of the gear shift lever to release said locking means.

7. In an attachment for synchronously releasing the locking means of an emergency brake lever on the throw of a gear shift lever for low gear, a releasing mechanism interposed between and having oppositely extending flexible means for connection to the gear shift lever and locking means respectively and actuated on such throw of the gear shift lever to release said locking means, said mechanism further including a pivoted element having said flexible means connected to opposite ends thereof.

8. In an attachment for synchronously releasing the locking means of an emergency brake lever on the throw of a gear shift lever for low gear, a releasing mechanism interposed between and having oppositely extending flexible means for connection to the gear shift lever and locking means respectively and actuated on such throw of the gear shift lever to release said locking means, said mechanism further including an eccentrically pivoted element having said flexible means connected to opposite ends thereof 9. In an attachment for synchronously releasing the locking means of an emergency brake lever on the throw of a gear shift lever for low gear, a releasing mechanism interposed between and having oppositely extending pulling members for connection to the gear shift lever and said locking means respectively and actuated on such throw of the gear shift lever to release said locking means, one of said members being lengthwise adjustable.

10. In an attachment for synchronously releasing the locking means of an emergency brake lever on the throw of a gear shift lever for low gear, a releasing mechanism interposed between and having oppositely extending pulling members for connection to the gear shift lever and said locking means respectively, and actuated on such throw of the gear shift lever to release said locking means, one of said members being lengthwise adjustable, said mechanism including means for detachably connecting it to the gear shift lever and locking means.

In testimony whereof, we affix our signatures hereto.

MACEO K. JACKSON.
EDWARD D. HACKETT.